United States Patent [19]

Lidman et al.

[11] Patent Number: 4,997,662
[45] Date of Patent: Mar. 5, 1991

[54] METHOD IN CONTINUOUS HEAT TREATMENT OF A LIQUID THE FLOW OF WHICH VARIES

[75] Inventors: Magnus Lidman, Tumba; Kare Eilertsen, Stockholm; Alf Karlsson, Hägersten, all of Sweden

[73] Assignee: Alfa-Laval AB, Tumba, Sweden

[21] Appl. No.: 435,465

[22] PCT Filed: Jun. 1, 1988

[86] PCT No.: PCT/SE88/00299
§ 371 Date: Nov. 29, 1989
§ 102(e) Date: Nov. 29, 1989

[87] PCT Pub. No.: WO88/09621
PCT Pub. Date: Dec. 15, 1988

[30] Foreign Application Priority Data

Jun. 5, 1987 [SE] Sweden .................. 8702365

[51] Int. Cl.⁵ .................. A23C 3/00; A23L 2/00
[52] U.S. Cl. .................. 426/231; 426/521; 426/522
[58] Field of Search .......... 426/231, 520, 521, 522

[56] References Cited

U.S. PATENT DOCUMENTS 2,052,396 8/1936 Getchell .................. 219/284
4,542,034 9/1985 Aule et al. .................. 426/522

FOREIGN PATENT DOCUMENTS

5725/85 3/1986 Denmark .
350176 10/1972 Sweden .
8101794-9 9/1981 Sweden .

*Primary Examiner*—George Yeung
*Attorney, Agent, or Firm*—Hovey, Williams, Timmons & Collins

[57] ABSTRACT

When continuously heat treating a liquid the flow of which varies, incoming liquid is preheated by already heated liquid and is then heated to a predetermined temperature-time-effect by a medium giving off heat in a second step. The flow of incoming liquid is sensed and controlled by a pump (1) with a variable capacity. The amount of heat needed to obtain the desired heating effect is influenced by a control unit (9). The heating effect is adjusted to the liquid flow by increasing/decreasing the temperature of the medium giving off heat or increasing/diminishing the flow of this medium from a heat store (6).

9 Claims, 1 Drawing Sheet

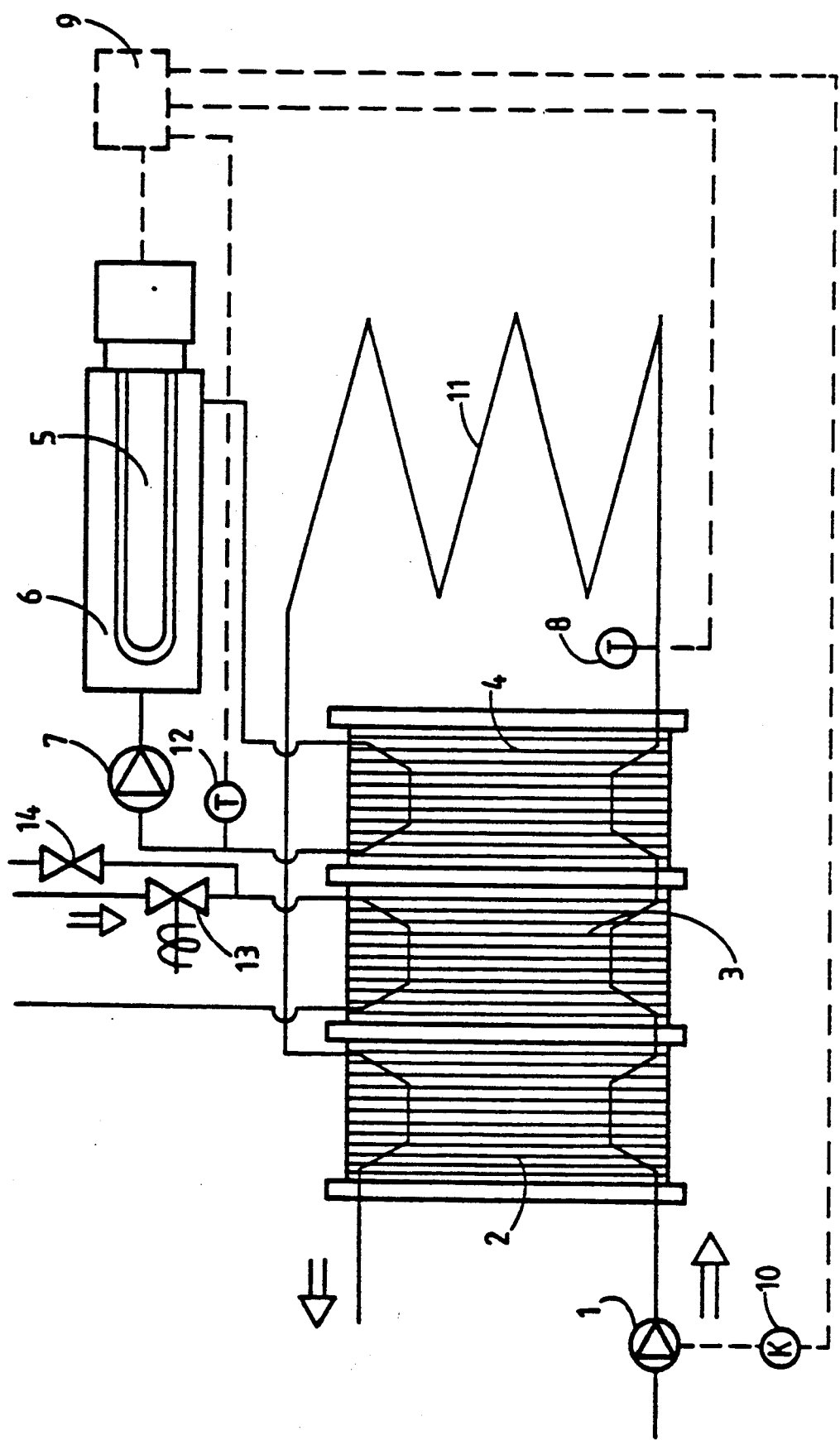

METHOD IN CONTINUOUS HEAT TREATMENT OF A LIQUID THE FLOW OF WHICH VARIES

BACKGROUND OF THE INVENTION

1. Field of the Invention

The present invention relates to a method for continuous heat treatment of a liquid the flow of which varies, at which the liquid is first prewarmed by already heat treated liquid and thereafter heated to a predetermined temperature by a medium giving off heat in a second step.

2. Description of the Prior Art

When machine milking cows the flow of milk varies strongly. The variation is caused partly by the construction of the milking plant and partly by the physiological properties of the cows.

Milking plants work with vacuum and the milk is transported through a pipe line system which has a mainly equal underpressure to a container, a so called end unit.

From the end unit the milk is pumped under atmospheric pressure through a pipe line to a cooling tank or some other storage vessel.

Usually the pump of the end unit starts when the level in the end unit reaches an upper limit level and stops at a lower limit level. The pump of the end unit consequently transports the milk in batches. The amount may vary between 10 and 20 liter for each batch and the pump starts about once per minute.

The cows in large herds are usually milked in two groups of six to twelve cows in each group. The collected milk flow varies with the time since the cows give a larger amount of milk at the start of the milking than at the end of the milking.

The separate cow gives at each milking a total amount which is depending of how long time that has lapsed since the cow calved. In regions where the calving takes place during a certain part of the year one must count with large seasonal variations in the milk flow.

Even if the calving due to semine treatment is distributed more uniformly over the year the cows, which at the moment are high producing, are usually milked at first. The milk flow will then be considerably higher at the start of each milking than at the end when the cows which are low producing for the moment are milked. The time for milking a cow is not changed, however, with the amount of milk given from the cow.

When one wants to heat treat milk with an equipment which is directly connected to the milking equipment the heating equipment must therefore be constructed such that the treatment results will be equal even when the flow of product varies.

The variation in flow which depends on the face that the pump in the previously mentioned end unit works periodically may simply be removed by technical measures. The variation in flow which depends on the physiological properties of the cows must be accepted anyhow.

A simple solution is to collect all the milk in a storage tank. At a suitable time the heating equipment is started and the equipment then works at its own capacity, independently of the milking, in order to end the process soon after the end of the milking.

Such a way of carrying through the heat treatment is anyhow contrary to the general desire that the milk should not be stored uncooled during the two to three hours during which the milking takes place. The average holding time for the milk in the tank may be kept shorter, but there are still risks for an increase in microorganisms in the tank resulting in a decreased milk quality. Since the aim of the heat treatment is to increase the quality of the milk it should be very unfortunate, if the construction of the equipment should influence the milk negatively.

The heat treatment of for example milk at a varying flow of product gives rise to two separate problems.

The first problem is that the storing time of the product at the heat treatment temperature will be inversely proportional to the product flow when the heating equipment has a holding cell with a constant volume (length). Variation of the length of the holding cell during that treatment is found to be technically complicated. If a varying holding time is accepted, the heat treatment temperature may instead be adjusted to the holding time, i.e. to the product flow. A condition is anyhow that the change in the flow takes place slower than the change in temperature.

The system that controls the flow must in other words have a larger inertia than the temperature control. Of course it is possible to achieve such a control equipment using flow meters, a regulator and a control valve. It is found anyhow that the adjustment may easily be carried through by means of a pump with a variable speed control which consequently controls the milk flow. The pump treats the milk very gently and the rotation speed of the pump may be changed slowly in such a way that the relation between temperature and time during the heat treatment will be the desired one. The control signal to the pump equipment may also in an easy way be arranged to control the temperature.

The flow controlling pump may then be controlled continuously between zero and the maximal flow through the heating equipment or be made to work at a number of predetermined flow levels and corresponding temperature levels.

The other problem depends on the fact that the milk flow sometimes stops wholly due to the fact that a cow gives problem which results in a stop in the milking. During the stop the heating equipment works normally as long as there is milk available, but it then lowers the capacity and stops at the end. The milk which is then present in the holding cell will become colder in spite of the heat insulation around the cell. When the equipment is then started again colder milk than usual will pass the holding cell and will then in the regenerative section of the heat exchanger heat incoming milk. In order to achieve the right heat treatment temperature in spite of the low temperature an extra heat effect which is several times greater than during a usual operating step will be needed. The heat treatment is for control technical reasons usually electric and a large connection effect always gives troubles on a farm.

Another possibility is to give the end heater a large heat capacity in such a way that the instantaneous effect needed for restarting may be met with stored heat. Unfortunately this also results in a large inertia in the temperature control and makes the earlier mentioned adjustment of the temperature more difficult.

SUMMARY OF THE INVENTION

The method according to the invention is stated in the attached claims.

According to the invention, one may in a predetermined degree heat treat a liquid the flow of which varies. This is of large advantage in relation to earlier techniques which needed intermediate storing of the liquid. If the liquid is milk, it is obtained from the milking at a temperature of about 35° C., which is a very troublesome temperature from a bacteriological point of view since many microorganisms grow maximally in this temperature range. If the liquid instead consists of juice or juice concentrates produced in one or several batch processes, the invention according to the claim also yields large advantages as relates to bacterial keeping qualities of these products.

When heat treating milk or other products with a varying flow, the flow of product may vary continuously or in steps between zero and a maximum flow defined by the equipment. Between zero and the maximum flow there is at least one intermediate step. The treatment temperature of the product is controlled by the flow in such a way that the time-temperature relation of the heat treatment will be constant and independent of the flow.

The flow of product may be controlled by a positive pump, the capacity of which is adjusted to the average value of the actual product flow and the flow of which is changed in such a pace that the time-temperature relation of the heat treatment may also be maintained when the flow is changed.

The change of the flow takes place so slowly that the equipment will be in thermal balance and the external heat addition will not exceed the maximal heat effect.

The heating equipment is connected to a heat store which gives the additional effect which is needed when the flow of product is changed.

The heating equipment has a section for final heating which is dimensioned to correspond to the need as the flow changes and the temperature is controlled by shunt coupling to a heat store.

The heating equipment has an additional section between the regenerative section and the final heating section. The final heater may in this case not be heated by water. The end user does not need to be water heated. The additional section is connected to a heat store which has a large momentaneous capacity, e.g. a water heater or a tap water system.

The additional heater is activated at the start, when the flow is changed, or when the temperature of the heating medium does not correspond to the desired value.

Warm water is made to flow through the additional section at the start, when the flow increases, or when the temperature of the heating media is too low. Cold water is made to flow through the additional section when the flow of product is diminishing or when the temperature of the heating media is too high.

The final heater is heated electrically or by way of circulating warm water heated by electricity in a known manner. The temperature of the process is controlled by controlling the added electrical effect.

The temperature of the heat treatment is controlled by measuring of the temperature of the heating medium and adjustment of the measured value with regard to the temperature decrease caused by the actual product flow.

The temperature of the heat treatment is controlled by temperature sensors in the flow of product during normal operation. When there is no milk flow, the temperature is controlled by sensing and controlling the temperature of the heating medium. The heating medium may consist of water or some other liquid. It may also consist of the wall of the flow channel surrounding the milk. The temperature at starts and at stops in the operation may be measured freely in proportion to the earlier mentioned time and temperature relation.

The temperature of the milk is controlled by letting a smaller or a larger amount of hot water from this hot water store be directed to the water flow which circulates through the heat exchanger. Simple valves for such a shunt regulation are difficult to switch over to give the adjustment mentioned earlier of the temperature and flow. It has been found that hot water from the water heater used for washing the milking equipment, which is set at 75°-80° C., may be used to cover the momentaneous need when restarting. The hot water is led through an additional section in the heat exchanger between the regenerative section mentioned above and the final heater. A valve opens and lets through hot water a number of seconds prior to the start of the milking pump and the temperature of the milk which leaves the additional section is roughly controlled by opening and closing said valve.

The additional section has proved so efficient that the heat treatment equipment may be started directly. No change over valve as in pasteurizing equipment is needed and consequently no product is led back to the tank for untreated milk. This is of an especially large importance if the heating equipment is connected after, for example, an ultrafilter for milk and only the concentrate is heat treated.

The described equipment for heat treatment is specially designed to be connected to the milking equipment. The flow of product varies considerably and living animals are involved in the process which, for example, may cause the flow of product to end completely, and the equipment must be restarted filled with milk.

The described equipment may of course also be used in other, less demanding connections when one works more or less in batches. An example thereof may be heat treatment of fruit juice from fruit processes working batchwise.

The arrangement for heat treatment of liquid the flow of which varies is described further with reference to the attached drawing.

BRIEF DESCRIPTION OF THE DRAWING

The FIGURE is a schematic view of a liquid heat treatment apparatus in accordance with the present invention.

The equipment for heat treatment is connected to a balance tank (not shown) which is either a modified end unit in the milking equipment or a separate tank with an adequate volume in order to equalize differences in the flow of product. From the balance tank the product is transported by a positive pump 1, the speed of which is controlled by level sensors in relation to the average level in the balance tank. The product flows into the regenerative heating section 2, where arriving product is heated by outgoing already heat treated product. In the heat exchanger section 4 the product is heated by a circulating water flow to the desired heat treatment temperature. The water is heated by an electrical element 5 in the water heater 6 and is brought to circulate through the heat exchanger section 4 by the pump 7. During normal operation the temperature of the product is controlled by the temperature sensor 8. A control unit 9 conrols the effect in the heat element 5 which is determined by the signal of the measured value from 8 and the signal of the wanted value from a control means 10 which controls the capacity of the pump 1.

Heat treatment of the product takes place in the heat exchanger section 4.

when heating the equipment prior to start the temperature in the heater 6 is controlled by the temperature sensor 12 arranged in the water flow. When the pump 1 starts a switch from the temperature sensor 12 to the temperature sensor 8 takes place. If the milk flow stops a switch to the temperature sensor 12 takes place when the pump 1 stops.

When the pump 1 works, the temperature sensor 12 is used to control the temperature of the water returning from the heat exchanger section 4. If this temperature in connection with start, restart or a rapid increase of the present flow is lower than a certain predetermined temperature the valve 13 is opened such that warm water flows through the section 2 and preheats the product. The valve 13 is open until the temperature of the returning water again is higher than a temperature limit and the valve 13 closes.

In the cases where a rapid regulation of the pump 1 is desired, for example when the balance tank has a small volume such that the capacity of the pump must be diminished rapidly when the milk flow stops, cold water from the valve 14 is used to counteract too high a temperature. The valve 14 may be opened when the temperature sensor 8 registers too high a temperature. As a rule this way of regulating the system is too slow when the flow of product diminishes. It is therefore preferred also in this case to supervise the temperature of the return water, which always flows with a high speed, with the temperature sensor 12 and to open the valve 14 when the temperature of the returning water is above certain values. In order to increase the rapidity in the whole regulating system it is in some cases preferred to regulate the temperature only with the temperature sensor 12 in the water flow. By correcting the signal from the temperature sensor for the difference in temperature between the product side of the heat exchanger and the water side of the same and for the decrease in temperature of the circulating water, at the flow given by the pump 7, the temperature of the product in the holding cell 11 may be controlled. Both these corrections are for a given product e.g. milk dependent on the flow of product. The correction may therefore be part of the time-temperature relation mentioned earlier. The accuracy of the controlling will be lower than if the temperature sensor 8 is used and the change of flow takes place slowly.

In an alternative embodiment the circulating water flow of the final heater is replaced with a solid body of heat conductive material which transfers heat from an electrical element to one or several flow channels for the product. In order to hinder sticking of the product in the flow channel the temperature of the heat transferring body is controlled by one or several temperature sensors.

The valves for warm and cold water 13 and 14 are in such a case actuated by way of signals from a temperature sensor located in the flow of product.

An equipment for heat treatment of max. 750 l/h milk handles three different flows 750, 500 and 375 l/h. The maximum flow is used when an upper level in the balance tank is passed. Between this level and an intermediate level the flow is 500 l/h and under the intermediate level the equipment works at 375 l/h. The balance tank has also a sensor for low level and when this is passed, the heat treatment equipment is changed into a waiting position.

Prior to milking the water heater 6 and the circulation pump 7 were started and the temperature in the circulation path was controlled by the sensor 12 to a suitable temperature for waiting position. When the level of milk 10-15 min. later reached the intermediate level in the balance tank, the warm water valve 10 opened for about 20 sec. before the pump was started with a capacity of 500 l/h. The milk from the balance tank presses away the water in the heat exchanger sections and in the holding cell. The water in the final heating section 4 has a temperature which corresponds to waiting position and this water reaches the sensor 8 which since th pump 1 has stated is active. The signal from the sensor makes the water temperature in the heater to increase up to a level corresponding to 500 l/h.

The milk which enters the heat exchanger section 2 meets cold water from the upper part of the holding cell 11 and is not heated until it reaches section 3 and there meets the flow of warm water. The water which is pressed out from section 2 and passes 3 has, as the water which at the start was present in 3, a normal operation temperature when it reaches section 4 and there is heated to the desired heat treatment temperature.

Through the holding cell 11 a plug flow of warm water will flow which plug flow is followed by warm milk in a second plug. The warm water and thereafter the milk, from the holding cell passes the regenerative section 2 which now starts preheating the incoming milk at the same time as outgoing flow is chilled. When the regenerative heating has reached full effect the temperature of the product which leaves 3 and flows into 4 increases. This is registered by the temperature sensor 12 which senses a higher temperature of the return water and then closes the warm water valve 13.

During start up the water which has been pressed away from the heat exchanger and the holding cell is conducted to waste through a valve (not shown in the figure), but about 60 seconds after start of the pump the boundary layer between water and milk has passed this valve, which is then closed, such that the milk is led further to a cooling tank.

The holding cell in the heat treatment equipment is dimensioned to give a holding time of 15 seconds at 750 l/h. The temperature is adjusted to 72° C. which corresponds to low temperature pasteurizing of milk. At the flow of 500 l/h the holding time will be 20 seconds and the corresponding temperature is then adjusted to 71° C. At a flow of 375 l/h the holding time is 30 seconds and the temperature should be 70° C. The figure shows how the temperature of the product is varied when the flow of product is changed.

When the milk flow suddenly disappeared the equipment stopped in a waiting position where the water temperature was lowered to 67° C. by the sensor 12. The figure shows the temperature at the entrance to the holding cell where the product is cooled independently of the control of the water temperature. When new milk enters the balance tank and the pump 1 is started it is seen how the warm water valve 13 is opened and gives a large increase to the heating effect.

We claim:

1. A method for the continuous heat treatment of a liquid subject to biological contamination, said method comprising the steps of:
   preheating incoming liquid by passing the incoming luquid in direct heat exchange relationship through a first heat exchange section with already heated outgoing liquid, to thereby preheat the incoming liquid and cool the outgoing liquid;
   controlling the flow of incoming liquid to said first section by passing the incoming liquid into and through a variable capacity pump while sensing the flow of incoming liquid to the pump and operating the pump at a desired operating speed;
   thereafter passing the preheated liquid in indirect heat exchange relationship through a second heat exchange section with a heat exchange medium, the heating capacity of said second section being adjustable by varying the heat input thereof, said heat input being dependent upon a temperature-time effect based on the temperature of said medium and the flow thereof through said second heat exchange section;
   controlling the heating of said preheated liquid in said second heat exchange section by adjusting said temperature-time effect in response to said pump operating speed; and
   said adjusting step comprising the step of varying the heat input of the second indirect heating section.

2. A method for the continuous heat treatment of a liquid as set forth in claim 1 wherein said heat exchange medium in said second heat exchange section comprises heated water.

3. A method for the continuous heat treatment of a liquid as set forth in claim 2 including the step of storing said heated water in a hot water storage, said storage having means for heating water circulated through said second heat exchange section.

4. A method for the continuous heat treatment of a liquid as set forth in claim 2 wherein said heated water is maintained at a temperature between 75 and 80 degres Centigrade in said hot water storage.

5. A method for the continuous heat treatment of a liquid as set forth in claim 3, including the step of sensing the temperature of said medium at a location external to said hot water storage.

6. A method for the continuous heat treatment of a liquid as set forth in claim 5, wherein the amount of heat supplied to said heated water is dependent on the sensed temperature of the water at said location.

7. A method for the continuous heat treatment of a liquid as set forth in claim 1, including the step of passing said liquid through a third heat exchanged section with a heat exchange medium after preheating said liquid in said first heat exchange section.

8. A method for the continuous heat treatment of a liquid as set forth in claim 7, wherein the heat exchange medium of said third heat exchange section includes means for alternately supplying heat to and removing heat from said incoming liquid depending on the temperature of said medium in said second heat exchanger section.

9. A method for the continuous heat treatment of a liquid as set forth in claim 8, wherein said heat exchange medium is water.

* * * * *

UNITED STATES PATENT AND TRADEMARK OFFICE
CERTIFICATE OF CORRECTION

PATENT NO. : 4,997,662

DATED : March 5, 1991

INVENTOR(S) : LIDMAN, Mangus; EILERTSEN, Kare; and KARLSSON, Alf

It is certified that error appears in the above-identified patent and that said Letters Patent is hereby corrected as shown below:

Title Page, item [73] Assignee: after "Alfa-Laval" please insert --Agricultute International--.

Signed and Sealed this

Twenty-second Day of September, 1992

Attest:

DOUGLAS B. COMER

*Attesting Officer*　　　*Acting Commissioner of Patents and Trademarks*